United States Patent
Ishizu

(10) Patent No.: US 10,997,230 B2
(45) Date of Patent: May 4, 2021

(54) IMAGE SUPPLY APPARATUS, INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Akihiko Ishizu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 222 days.

(21) Appl. No.: 15/966,051

(22) Filed: Apr. 30, 2018

(65) Prior Publication Data

US 2018/0322148 A1     Nov. 8, 2018

(30) Foreign Application Priority Data

May 2, 2017 (JP) .............................. JP2017-091945

(51) Int. Cl.
| | |
|---|---|
| *G06F 16/54* | (2019.01) |
| *G06F 3/0482* | (2013.01) |
| *H04L 29/06* | (2006.01) |
| *G06F 16/58* | (2019.01) |
| *H04L 29/08* | (2006.01) |

(52) U.S. Cl.
CPC ............ *G06F 16/54* (2019.01); *G06F 3/0482* (2013.01); *G06F 16/5866* (2019.01); *H04L 67/02* (2013.01); *H04L 67/04* (2013.01); *H04L 67/125* (2013.01); *H04L 67/42* (2013.01)

(58) Field of Classification Search
CPC ... H04L 67/02; H04L 65/1069; H04L 67/143; H04L 67/26; H04L 67/42; H04L 67/04; H04L 67/125; H04L 67/06; H04L 29/0809; H04L 29/08117; G06F 16/58; G06F 3/1288; G06F 3/147; G06F 16/54; G06F 3/0482; G06F 16/5866; G06F 16/1787;

(Continued)

(56) References Cited

U.S. PATENT DOCUMENTS

| | | | |
|---|---|---|---|
| 2008/0168394 A1* | 7/2008 | Kawasaki | G06F 16/58 715/811 |
| 2009/0128634 A1* | 5/2009 | Miura | H04N 5/765 348/207.1 |

(Continued)

FOREIGN PATENT DOCUMENTS

JP         2013-162303 A     8/2013

*Primary Examiner* — Andrew L Tank
(74) *Attorney, Agent, or Firm* — Cowan, Liebowitz & Latman, P.C.

(57) ABSTRACT

The present invention enables an image selected by a user on the server side to be sent to a client in a client-server protocol. An image supply apparatus includes a storage unit storing images; a communication unit; and a processing unit that returns a response by performing processing in accordance with a type of a request received from a client. Here, the processing unit includes a display unit that displays, when a predetermined request is received, a list of images stored in the storage unit; a generation unit that generates, when a user has selected an image, information specifying the selected image for enabling the client to make a sending request for the selected image; and a sending unit that sends the generated information to the client as a response to the predetermined request.

16 Claims, 12 Drawing Sheets

(58) Field of Classification Search
CPC . G06F 16/95; G09G 2354/00; G09G 2380/16
See application file for complete search history.

(56) References Cited

U.S. PATENT DOCUMENTS

| | | | |
|---|---|---|---|
| 2011/0141293 A1* | 6/2011 | Yoneyama | H04N 1/00283 348/207.1 |
| 2012/0131465 A1* | 5/2012 | Telek | H04N 1/00347 715/733 |
| 2013/0060950 A1* | 3/2013 | Furuta | G06F 3/1287 709/227 |
| 2014/0201376 A1* | 7/2014 | Godin | H04L 65/1069 709/227 |

* cited by examiner

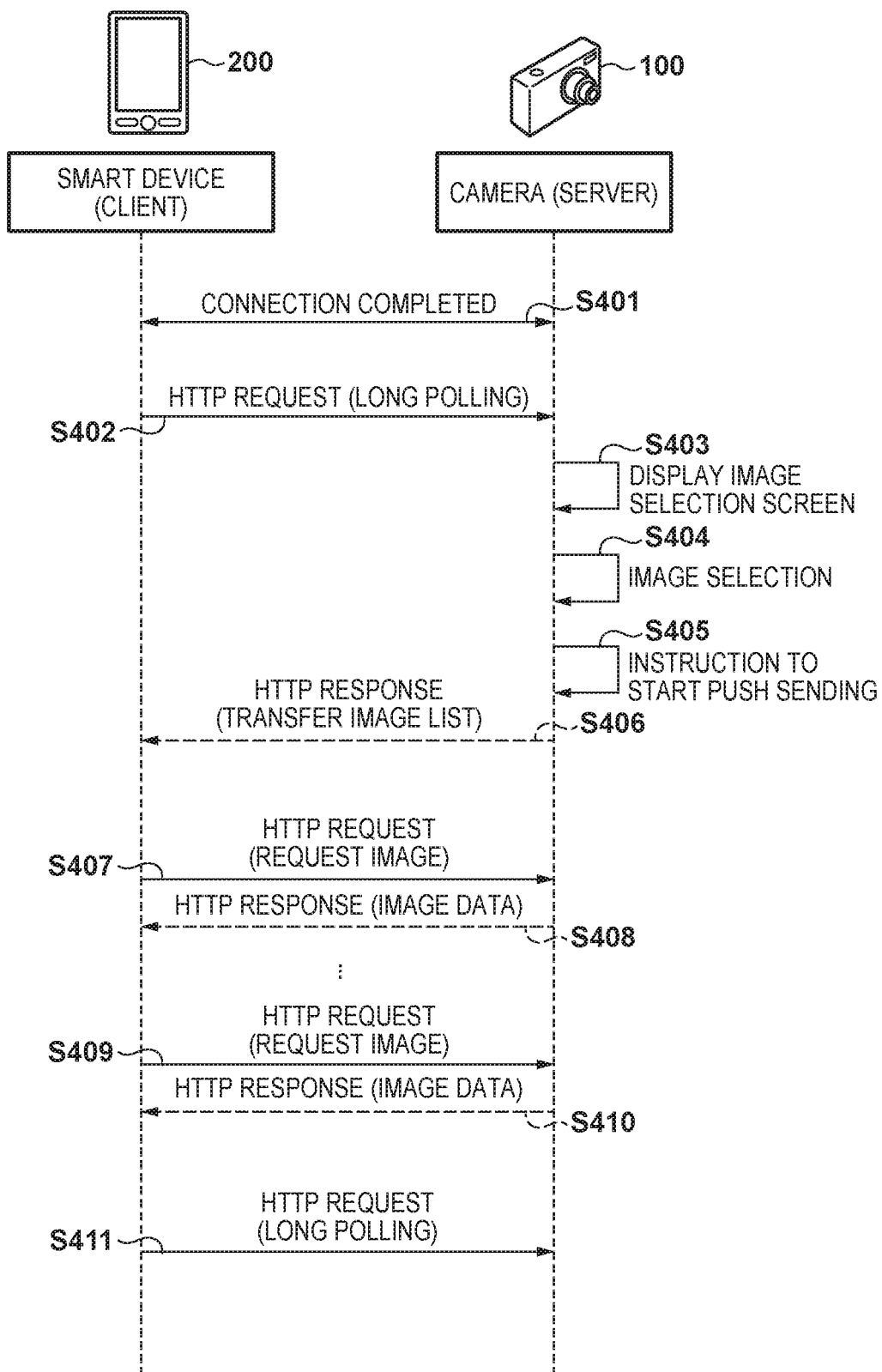

IMAGE SUPPLY APPARATUS, INFORMATION PROCESSING APPARATUS, CONTROL METHOD THEREOF, AND STORAGE MEDIUM

BACKGROUND OF THE INVENTION

Field of the Invention

The present invention relates to an image supply apparatus, an information processing apparatus, a control method thereof, and a storage medium.

Description of the Related Art

In recent practices, a digital camera and a mobile phone are wirelessly connected to enable the function of the digital camera to be used from the mobile phone. For example, Japanese Patent Laid-Open No. 2013-162303 discloses a system in which a digital camera and a mobile phone are connected via a wireless LAN to remotely view images recorded in the digital camera by operating the mobile phone.

However, in the case of using a communication protocol, such as an HTTP (Hypertext Transfer Protocol), that implements a client-server system, an image selected in a server device cannot be sent to a client device.

SUMMARY OF THE INVENTION

The present invention provides a technique for sending an image selected in a server device to a client device in a communication protocol to implement a client-server system.

According to an aspect of the invention, there is provided an image supply apparatus that sends an image in response to a request from a client, comprising: a storage unit that stores an image; a communication unit that performs communication using a request/response communication protocol; and a processing unit that returns a response via the communication unit by performing processing in accordance with a type of a request received from a client via the communication unit, wherein the processing unit includes: a display unit that displays, when a predetermined request is received, a list of images stored in the storage unit, as a user interface selectable by a user, before sending a response to the predetermined request; a generation unit that generates, when the user has selected an image via the user interface, information specifying the selected image for enabling the client to make a sending request for the selected image; and a sending unit that sends the information generated by the generation unit to the client as a response to the predetermined request.

According to the present invention, it is possible to send an image selected by a user on the server side to a client in a client-server protocol.

Further features of the present invention will become apparent from the following description of exemplary embodiments (with reference to the attached drawings).

BRIEF DESCRIPTION OF THE DRAWINGS

FIG. 4 is a diagram showing a sequence performed in a system according to the first embodiment.

DESCRIPTION OF THE EMBODIMENTS

Hereinafter, embodiments for implementing the present invention will be described in detail with reference to the accompanying drawings. It should be noted that the embodiments described below are merely exemplary means for implementing the present invention, and may be appropriately modified or changed depending on the configuration of an apparatus to which the invention is applied and various conditions. The embodiments may be also combined as appropriate.

First Embodiment

Internal Configuration of Digital Camera 100

Figure 1:
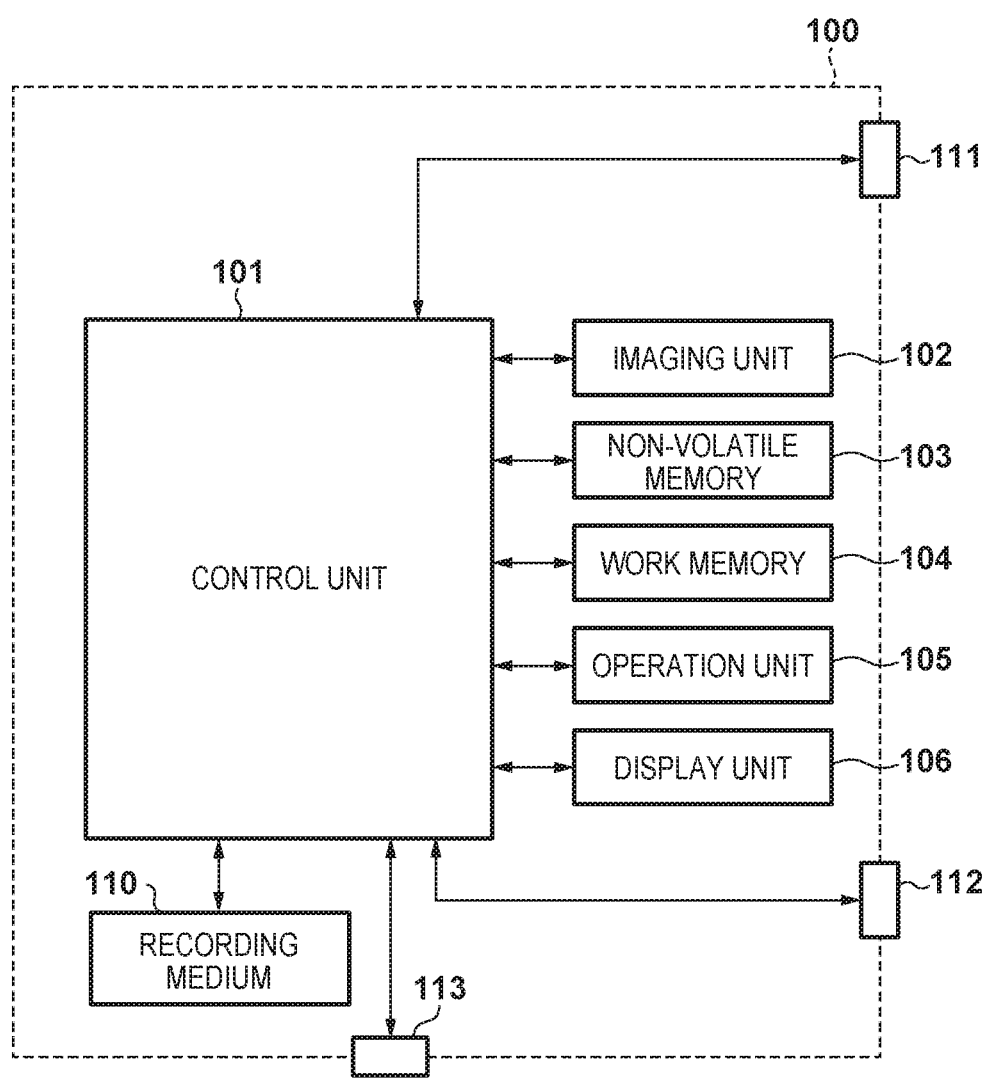
FIG. 1 is a block diagram showing a configuration of a digital camera according to a first embodiment.

FIG. 1 is a block diagram showing an exemplary configuration of a digital camera 100 functioning as a server-side image supply apparatus according to the present embodiment. Although a digital camera is described as an example of the image supply apparatus, the present invention is not limited thereto. For example, the image supply apparatus may be a portable media player, or a communication apparatus such as a so-called tablet device or a personal computer.

A control unit 101 includes a processor (CPU), and controls various units of the digital camera 100 in accordance with input signals and a program described below. Note that the overall apparatus may also be controlled by a plurality of pieces of hardware sharing the processing therebetween, instead of the control unit 101 controlling the overall apparatus.

An imaging unit 102 is composed of, for example, an optical lens unit, an optical system that controls a diaphragm, zooming, focusing, and the like, and an imaging element for converting light (video image) introduced through the optical lens unit into an electrical image signal. In general, a CMOS (Complementary Metal Oxide Semiconductor), a CCD (Charge Coupled Device), or the like is used as the imaging element. By being controlled by the control unit 101, the imaging unit 102 converts object light of which image is formed by the lens into an electric signal using the imaging element. In addition, the imaging unit 102 obtains digital image data by performing noise reduction processing or the like based on the electric signal, and outputs the image data. The digital camera 100 according to the present embodiment records the image data in a recording medium 110 in accordance with the DCF (Design Rule for Camera File system) standard.

A non-volatile memory 103 is an electrically erasable/recordable nonvolatile memory, and stores, for example, a program described below that is executed by the control unit 101. A work memory 104 is used as a buffer memory that temporarily holds image data imaged by the imaging unit 102, an image display memory of a display unit 106, a work area for the control unit 101, or the like.

An operation unit 105 is used to accept an instruction given to the digital camera 100 from a user. The operation unit 105 includes, for example, a power button for allowing the user to instruct to turn ON/OFF the power supply of the digital camera 100, a release switch for instructing image capturing, and a reproduction button for instructing reproduction of image data. The operation unit 105 further includes an operation member such as a dedicated connection button for staring communication with an external device via a connecting interface 111 described below. In addition, the operation unit 105 includes a touch panel formed on a display unit 106 described below. Note that the release switch is composed of a first switch and a second switch. The first switch is turned ON when the release switch is brought into the so-called half-pressed state. Consequently, an instruction to prepare image capturing, such as AF (auto focus) processing, AE (auto exposure) processing, AWB (auto white balance) processing, and EF (electronic flash preliminary emission) processing, is accepted. The second switch is turned ON when the release switch is brought into the so-called full-pressed state. Consequently, an instruction to perform image capturing is accepted.

A display unit 106 displays a viewfinder image during image capturing, captured image data, characters for interactive operations, and the like. Note that the display unit 106 may not necessarily be built into the digital camera 100. It is sufficient for the digital camera 100 to be able to connect to an internal or external display unit 106, and to include at least a display control function for controlling display of the display unit 106.

The recording medium 110 can record image data output from the imaging unit 102. The recording medium 110 may be configured to be removable from the digital camera 100, or may be built into the digital camera 100. That is, it is sufficient for the digital camera 100 to include at least means for accessing the recording medium 110.

A connecting interface 111 is an interface for connecting to an external apparatus. The digital camera 100 according to the present embodiment can exchange data with an external apparatus via the connecting interface 111. For example, image data generated by the imaging unit 102 can be sent to the external apparatus via the connecting interface 111. Note that in the present embodiment, the connecting interface 111 includes an interface for communicating with the external apparatus using a so-called wireless LAN in compliance with the IEEE 802.11 standard. The control unit 101 implements wireless communication with the external apparatus by controlling the connecting interface 111. Note that the communication method is not limited to a wireless LAN, and includes, for example, an infrared communication method. The connecting interface 111 is an example of first wireless communication means.

A short distance wireless communication unit 112 is composed of, for example, an antenna for wireless communication, and a modulation demodulation circuit and a communication controller for processing wireless signals. The short distance wireless communication unit 112 implements short distance wireless communication in compliance with the IEEE 802.15 standard (the so-called Bluetooth™) by outputting a modulated wireless signal from the antenna, and demodulating a wireless signal received by the antenna. In the present embodiment, the Bluetooth™ communication employs the Bluetooth™ Low Energy version 4.0, which has low power consumption. The Bluetooth™ communication has a narrower communicable range (i.e., has a shorter communicable distance) than the wireless LAN communication. In addition, the Bluetooth™ communication has a slower communication speed than the wireless LAN communication. On the other hand, the Bluetooth™ communication has a lower power consumption than the wireless LAN communication. The digital camera 100 according to the present embodiment can exchange data with an external apparatus via the short distance wireless communication unit 112. For example, when an image capturing command is received from the external apparatus, the digital camera 100 controls the imaging unit 102 to perform an image capturing operation. When a command for sending/receiving data via wireless LAN communication is received, the digital camera 100 controls the connecting interface 111 to start wireless LAN communication.

A close proximity wireless communication unit 113 is composed of, for example, an antenna for wireless communication, and a modulation demodulation circuit and a communication controller for processing wireless signals. The close proximity wireless communication unit 113 implements non-contact close proximity communication in compliance with the ISO/IEC 18092 standard (the so-called NFC: Near Field Communication) by outputting a modulated wireless signal from the antenna, and demodulating a wireless signal received by the antenna. The close proximity wireless communication unit 113 according to the present embodiment is disposed on a side portion of the digital camera 100.

The digital camera 100 is connected to the smart device 200 by bringing the respective close proximity wireless communication units into close proximity to each other to start communication. Note that in the case of connecting the digital camera 100 and the smart device 200 by using the close proximity wireless communication units, the close proximity wireless communication units do not necessarily need to be brought into contact with each other. The close proximity wireless communication units can communicate with each other even when they are separated from each other by a certain distance. Accordingly, in order to connect the digital camera 100 and the smart device 200, it is sufficient to bring their close proximity wireless communication units close to each other to a range where close proximity wireless communication can be established. In the following description, bringing the close proximity wireless communication units to a range where close proximity wireless communication can be established is also referred to as bringing them into close proximity.

Communication will not be started when the respective close proximity wireless communication units of the digital camera 100 and the smart device 200 are within a range where close proximity wireless communication cannot be established. When the respective close proximity wireless communication units of digital cameras 100 are in a range where close proximity wireless communication can be established, and communication connection is established between the digital cameras 100, the communication connection is released if their respective close proximity wireless communication units 113 are separated from each other to a range where close proximity wireless communication cannot be established. Note that the non-contact close proximity communication implemented by the close proximity wireless communication unit 113 is not limited to NFC, and another wireless communication may be employed. For example, a non-contact close proximity communication in compliance with the ISO/IEC 14443 standard may be employed as the non-contact close proximity communication implemented by the close proximity wireless communication unit 113.

In the present embodiment, the communication speed of communication implemented by the connecting interface 111 is faster than the communication speed of communication implemented by a close proximity wireless communication unit 113 described below. In addition, communication implemented by the connecting interface 111 has a wider communicable range than communication implemented by the close proximity wireless communication unit 113. Instead, communication implemented by the close proximity wireless communication unit 113 can limit the other communication party due to the narrowness of the communicable range, and thus does not require processing, such as exchanging of a cryptographic key, required for communication implemented by the connecting interface 111. That is, communication can be more easily performed than by using the connecting interface 111.

Note that the connecting interface 111 of the digital camera 100 according to the present embodiment has an AP mode in which the connecting interface 111 operates as an access point in an infrastructure mode, and a CL mode in which the connecting interface 111 operates as a client in the infrastructure mode. Then, by causing the connecting interface 111 to operate in the CL mode, the digital camera 100 according to the present embodiment can operate as a CL device in the infrastructure mode. When the digital camera 100 operates as the CL device, the digital camera 100 can participate in a network formed by the AP device by connecting to a peripheral AP device. By causing the connecting interface 111 to operate in the AP mode, the digital camera 100 according to the present embodiment can operate as a simplified AP (hereinafter referred to as a "simple AP"), which is one type of AP but has more limited functions. When the digital camera 100 operates as the simple AP, the digital camera 100 forms a network by itself. A peripheral apparatus of the digital camera 100 recognizes the digital camera 100 as the AP device, and can participate in the network formed by the digital camera 100. It is assumed that a program for causing the digital camera 100 to operate in the above-described manner is held in the non-volatile memory 103.

Note that the digital camera 100 according to the present embodiment is one type of AP, but is a simple AP that does not have a gateway function for transferring the data received from the CL device to an Internet service provider or the like. Therefore, even when the digital camera 100 receives data from another apparatus participating in the network formed by the digital camera 100, the digital camera 100 cannot transfer the data to a network such as the Internet. The foregoing is the description of the digital camera 100 according to the embodiment.

Internal Configuration of Smart Device 200

Figure 2:
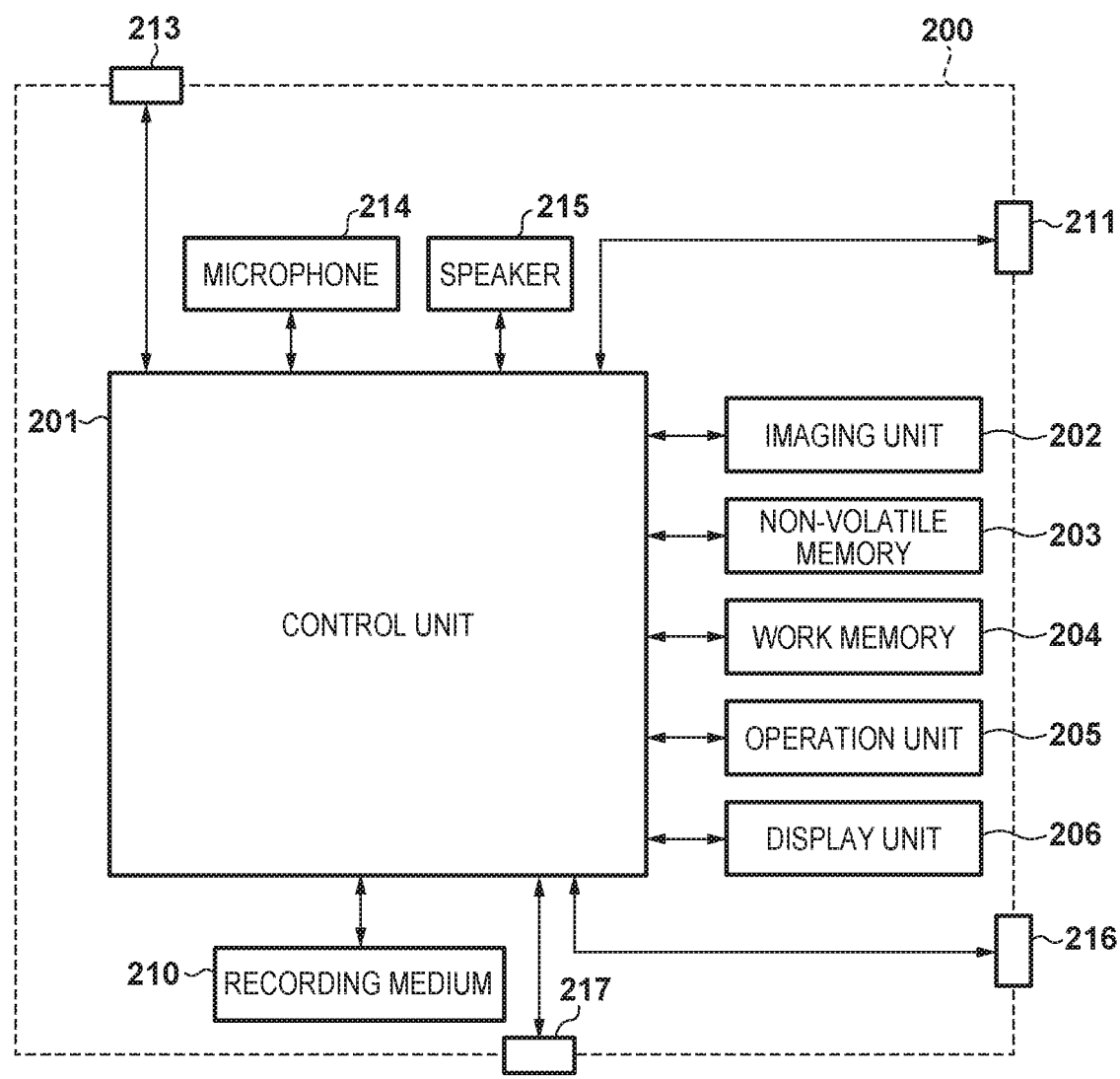
FIG. 2 is a block diagram showing a configuration of a smart device according to the first embodiment.

FIG. 2 is a block diagram showing an exemplary configuration of a smart device 200, which is an example of an information processing apparatus according to the present embodiment. Although a smart device will be described as an example of the information processing apparatus here, the information processing apparatus is not limited thereto. For example, the information processing apparatus may be a wireless-enabled digital camera, tablet device, or personal computer.

A control unit 201 includes a processor (CPU), and controls various units of the smart device 200 in accordance with input signals and a program described below. Note that the overall apparatus may also be controlled by a plurality of pieces of hardware sharing the processing therebetween, instead of the control unit 201 controlling the overall apparatus.

An imaging unit 202 converts object light of which image is formed by a lens included in the imaging unit 202 into an electric signal, performs noise reduction processing and the like, and outputs digital data as image data. The imaged image data is accumulated in a buffer memory, which is then subjected to a predetermined arithmetic operation by the control unit 201, and is recorded in a recording medium 210.

A non-volatile memory 203 is electrically erasable/recordable nonvolatile memory. In the non-volatile memory 203, an OS (operating system) serving as basic software executed by the control unit 201, and an application that implements applied functions in cooperation with the OS are recorded. In the present embodiment, the non-volatile memory 203 stores an application (hereinafter referred to as an "app") for communicating with the digital camera 100.

A work memory 204 is used as an image display memory for a display unit 206, a work area for the control unit 201, or the like. An operation unit 205 is used to accept an instruction to the smart device 200 from the user. The operation unit 205 includes, for example, a power button for the user to instruct to turn ON/OFF of the power supply of the smart device 200, and an operation member such as a touch panel formed on the display unit 206.

A display unit 206 displays image data, characters for interactive operation, and the like. Note that the display unit 206 does not necessarily need to be included in the smart device 200. It is sufficient for the smart device 200 to be able to connect to the display unit 206, and to include at least a display control function for controlling the display of the display unit 206.

A recording medium 210 can record image data output from the imaging unit 202. The recording medium 210 may be configured to be removable from the smart device 200, or may be built into the smart device 200. That is, it is sufficient for the smart device 200 to include at least means for accessing the recording medium 210.

A connecting interface 211 is an interface for connecting to an external apparatus. The smart device 200 according to the present embodiment can exchange data with the digital camera 100 via the connecting interface 211. In the present embodiment, the connecting interface 211 is an antenna, and the control unit 201 can connect to the digital camera 100 via the antenna. Note that a connection to the digital camera 100 may be established directly, or may be established via an access point. As a protocol for communicating data, PTP/IP (Picture Transfer Protocol over Internet Protocol) over a wireless LAN can be used, for example. Note that communication with the digital camera 100 is not limited thereto. For example, the connecting interface 211 may include a wireless communication module such as an infrared communication module, or a Wireless USB. Furthermore, a wired connection such as a USB cable, HDMI, or IEEE 1394 may be employed.

A public network connecting interface 213 is an interface used for performing public wireless communication. The smart device 200 can make a call to another device via the public network connecting interface 213. At this time, the control unit 201 implements a call by inputting/outputting audio signals via a microphone 214 and a speaker 215. In the present embodiment, the public network connecting interface 213 is an antenna, and the control unit 201 can connect to a public network via the antenna. Note that one antenna can be used for both the connecting interface 211 and the public network connecting interface 213.

A short distance wireless communication unit 216 is composed of, for example, an antenna for wireless communication, and a modulation demodulation circuit and a communication controller for processing wireless signals. The short distance wireless communication unit 216 implements short distance wireless communication in compliance with the IEEE 802.15 standard (the so-called Bluetooth™) by outputting a modulated wireless signal from the antenna, and demodulating a wireless signal received via the antenna. In the present embodiment, the Bluetooth™ communication employs the Bluetooth™ Low Energy version 4.0 (BLE), which has low power consumption. This Bluetooth™ communication has a narrower communicable range (i.e., a shorter communicable distance) than wireless LAN communication. In addition, the Bluetooth™ communication has a slower communication speed than wireless LAN communication. On the other hand, the Bluetooth™ communication has a lower power consumption than wireless LAN communication.

A close proximity wireless communication unit 217 is a communication unit for implementing non-contact close proximity communication with another device. The close proximity wireless communication unit 217 is composed of an antenna for wireless communication, and a modulation demodulation circuit and a communication controller for processing wireless signals. The close proximity wireless communication unit 217 implements non-contact close proximity communication by outputting a modulated wireless signal from the antenna, and demodulates a wireless signal received via the antenna. Here, non-contact communication in compliance with the ISO/IEC 18092 standard (the so-called NFC) is implemented. Upon reception of a data read-out request from another device, the close proximity wireless communication unit 217 outputs response data based on the data stored in the non-volatile memory 203. In the present embodiment, the smart device 200 operates in a card reader mode, a card writer mode, and a P2P mode, which are defined in the NFC standards, via the close proximity wireless communication unit 217, and mainly acts as an Initiator. In contrast, the digital camera 100 mainly acts as a Target via the close proximity wireless communication unit 113. The foregoing is the description of the smart device 200.

Sending Mode

Figure 3A:
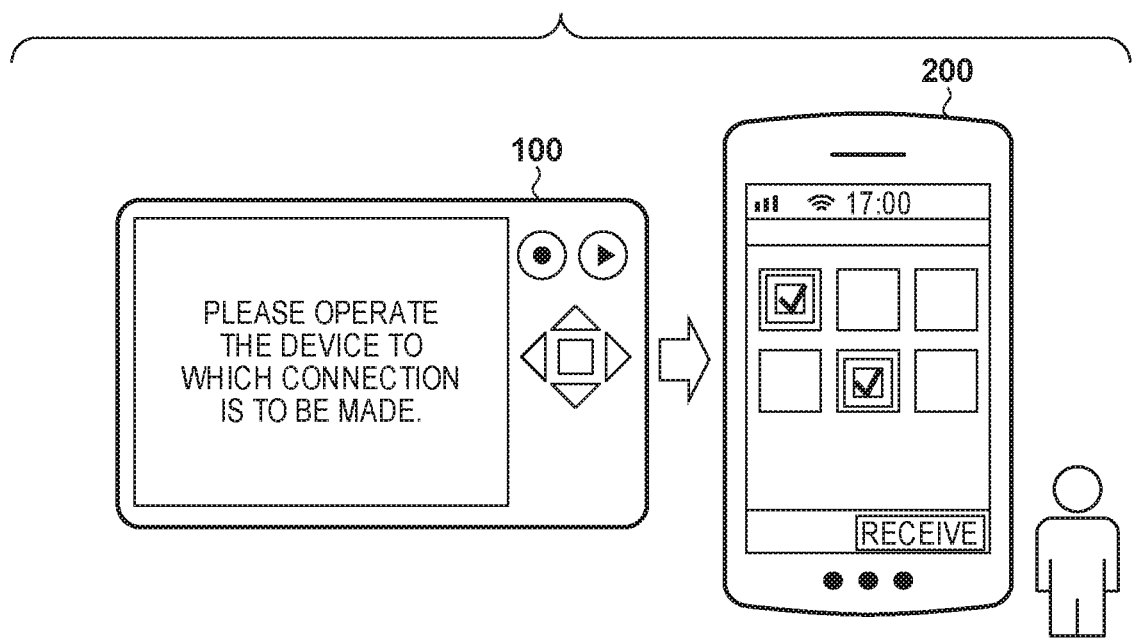
FIGS. 3A and 3B are diagrams showing exemplary displays of the digital camera and the smart device when the sending mode includes pull sending and push sending.
Figure 3B:
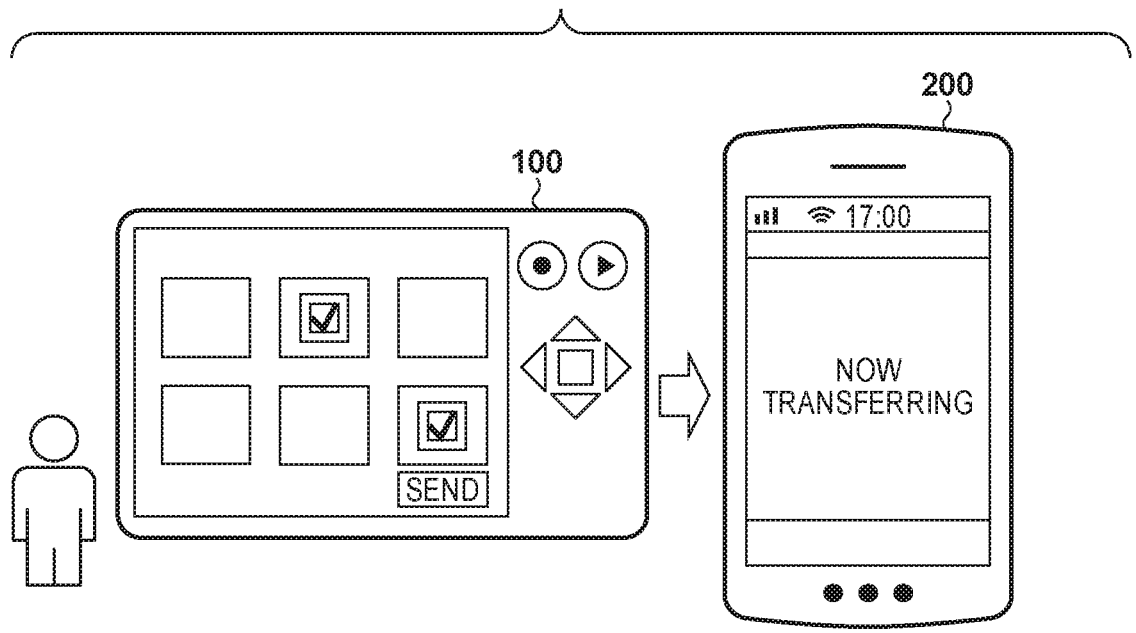

FIGS. 3A and 3B show images for illustrating sending modes different from each other. With reference to the drawings, a description will be given of the difference between the sending modes in the sending method used for sending a file saved in the digital camera 100 to the smart device 200 functioning as a client device when the digital camera 100 functions as a server.

FIG. 3A shows an image when the sending mode is pull sending. In pull sending, a user interface for allowing the user to make an image selection is displayed at the client device (smart device 200), and the user selects a file to be sent. In the pull sending mode, the client device makes a request for the selected file to the server device, and the server device sends the requested file to the client device.

FIG. 3B shows an image when the sending mode is push sending. In push sending, a user interface for allowing the user to make an image selection is displayed at the server device (digital camera 100), and the user selects a file to be sent. Upon completion of the selection, the server device sends the selected file.

Here, in the case of using a request/response communication protocol such as HTTP, the selected image cannot be voluntarily sent from the digital camera 100 serving as the server device, to the smart device 200 serving as the client device. To solve this problem, it is necessary to achieve voluntary sending from the server side (server push).

Therefore, in the present embodiment, a technique called long polling is used to achieve an emulated server push. In long polling, first, a request is sent from the client device, and the server intentionally holds a response to that request. Then, the server sends the held response to the request at given timing for performing some data communication. Doing so makes it possible to achieve, in an emulated manner, a so-called server push in which data is sent from the server to the client at given timing.

In the following, specific operations will be described. In the present embodiment, as already described, an example in which the digital camera 100 operates as a server and the smart device 200 operates as a client will be described.

A flow of processing performed at the time of sending an image by push sending to the smart device 200 by operating the digital camera 100 will be described with reference to FIG. 4 and FIGS. 5A to 5D.

FIG. 4 is a diagram showing a sequence performed at the time of sending an image by push sending from the digital camera 100 to the smart device 200.

FIGS. 5A to 5D are diagrams showing exemplary screens of the digital camera 100 and the smart device 200.

First, in step S401, the digital camera 100 and the smart device 200 make a Wi-Fi connection using the connecting interfaces 111 and 211, discover each other using a device discovering protocol, and make a protocol connection for performing data communication, thereby completing connection therebetween. Examples of the protocol for performing data communication include HTTP. It should be noted that the digital camera 100 operates as an HTTP server and the smart device 200 operates as an HTTP client in the present embodiment.

Next, in step S402, the smart device 200 serving as a client sends a long polling request to the digital camera 100. To differentiate a long polling request from a regular request, it is possible to add a specific argument or flag to a request command, or prepare a separate request command, for example.

In step S403, the digital camera 100 that has received the long polling request holds a response to this request instead of immediately sending the response, and displays an image selection screen for allowing the user to select an image to be sent by push sending to the smart device 200. As indicated by reference numeral 501 in FIG. 5A, the digital camera 100 displays a list screen for images saved in the recording medium 110.

Figure 5A:
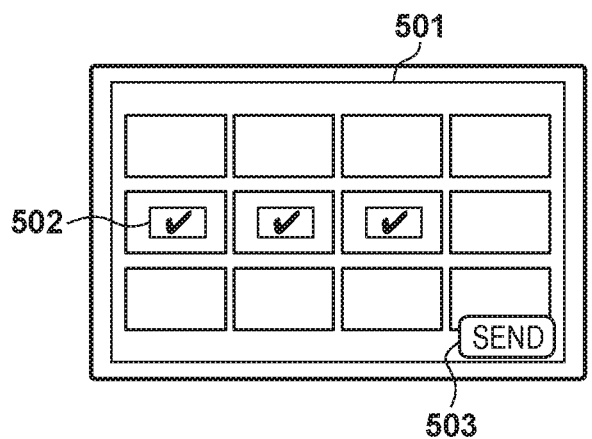
FIGS. 5A to 5D are diagrams illustrating UIs of the smart device and the digital camera according to the first embodiment.
Figure 5B:
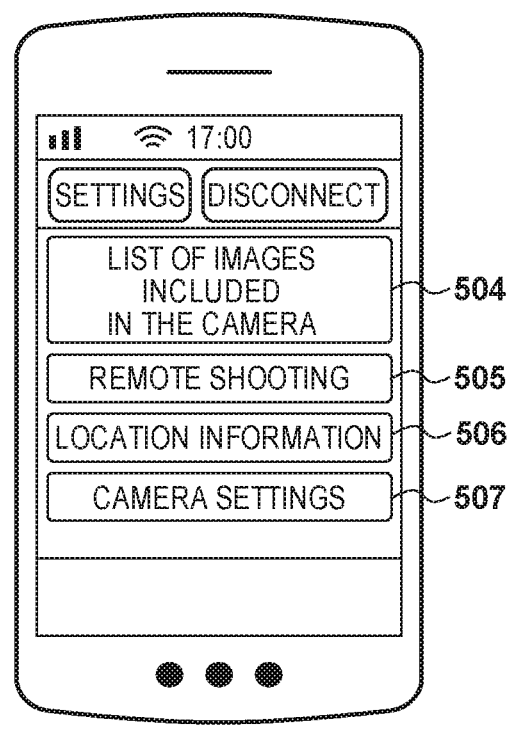

As shown in FIG. 5B, the smart device 200 displays an operation menu on the display unit 206. As indicated by reference numerals 504 to 507, from this menu, the user can operate buttons for processing items such as "List of images included in the camera", "Remote shooting", "Location information", and "Camera settings". When the user depresses any of the buttons 504 to 507, processing corresponding to the depressed button is executed. Here, the description is continued assuming that the user does not operate the smart device 200.

Next, in step S404, the user selects an image to be sent by push sending to the smart device 200 by operating the operation unit 105 of the digital camera 100. When the user selects the image to be sent, a check mark is displayed as indicated by reference numeral 502 in FIG. 5A. Note that FIG. 5A shows that three images are selected.

Next, in step S405, the user instructs to start push sending of the images selected in step S404 to the smart device 200 by operating the digital camera 100. By the user selecting the send button 503 shown in FIG. 5A, sending of the images to the smart device 200 can be started.

Next, in step S406, the digital camera 100 sends information (image list) specifying the images selected by the user in step S404 to the smart device 200 as a response to the long polling request. The file name, the image ID, and the like of the images selected by the user are described in the image list. In the above-described example, the smart device 200 cannot predict when the image selection performed in the user will be completed. Therefore, a configuration in which the digital camera 100 voluntarily sends the image list to the smart device 200 after the image selection is suitable.

Next, in step S407, the smart device 200 sends an image acquisition request to the digital camera 100 for one of the images described in the image list received in step S406. In step S408, the digital camera 100 sends the specified image to the smart device 200 in response to the image acquisition request received in step S407.

The smart device 200 acquires images by repeatedly making an image acquisition request to the digital camera 100 for the number of times equal to the number of the images included in the image list received in step S406. The acquired images are saved, for example, in the non-volatile memory 203 or the recording medium 210.

Figure 5C:
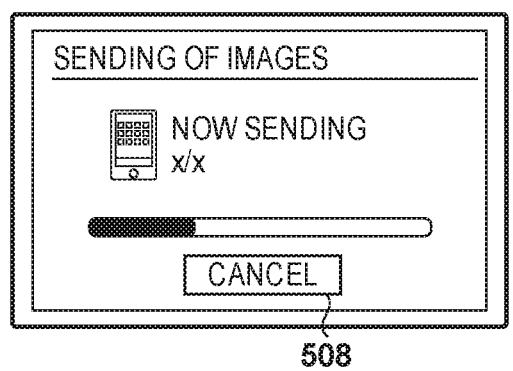
Figure 5D:
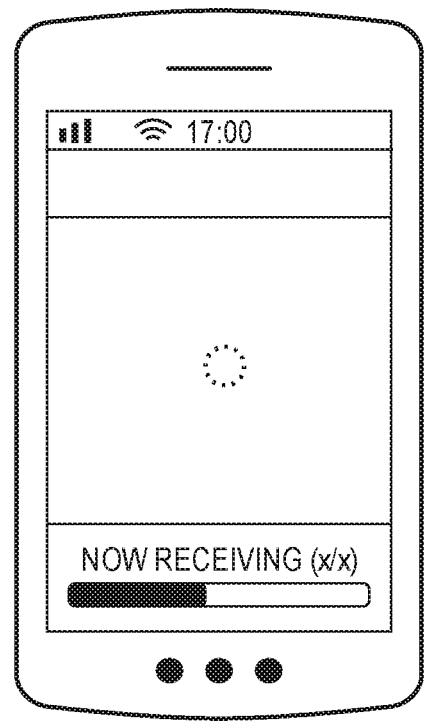

Exemplary screens displayed on the digital camera 100 and the smart device 200 while images are being transferred are shown in FIGS. 5C and 5D, respectively. As shown in FIG. 5C, the digital camera 100 displays a progress bar such that the state of progress of sending of the images can be seen. Also, as shown in FIG. 5D, the smart device 200 displays a progress bar such that the state of progress of reception of the images can be seen.

In step S411, upon reception of all the images included in the image list received in S406 from the digital camera 100, the smart device 200 sends a long polling request to the digital camera 100 again. The digital camera 100 that has received the long polling request displays an image selection screen so as to allow the user to make an image selection as in step S403. After completion of sending of the images, the screens of the digital camera 100 and the smart device 200 return to the screens displayed before sending of the images, as shown in FIGS. 5A and 5B, respectively.

As described above, while using a request/response communication protocol such as an HTTP protocol, the digital camera 100 includes the image list selected by the user in the response to the long polling request from the smart device 200. Consequently, images can be sent by push sending from the digital camera 100 to the smart device 200.

Note that cancellation processing may be performed while sending images. For example, if an operation of a cancel button 508 as shown in FIG. 5C by the user is detected during image sending processing, the control unit 101 of the digital camera 100 waits for completion of sending of an image of interest that is currently being sent, and, when the next image request is received, returns a denial (cancellation) to that request as a response. Consequently, in processing for sending a plurality of images selected by the user, the sending processing can be interrupted in the middle of the processing.

Processing Performed in Digital Camera 100

Figure 6:
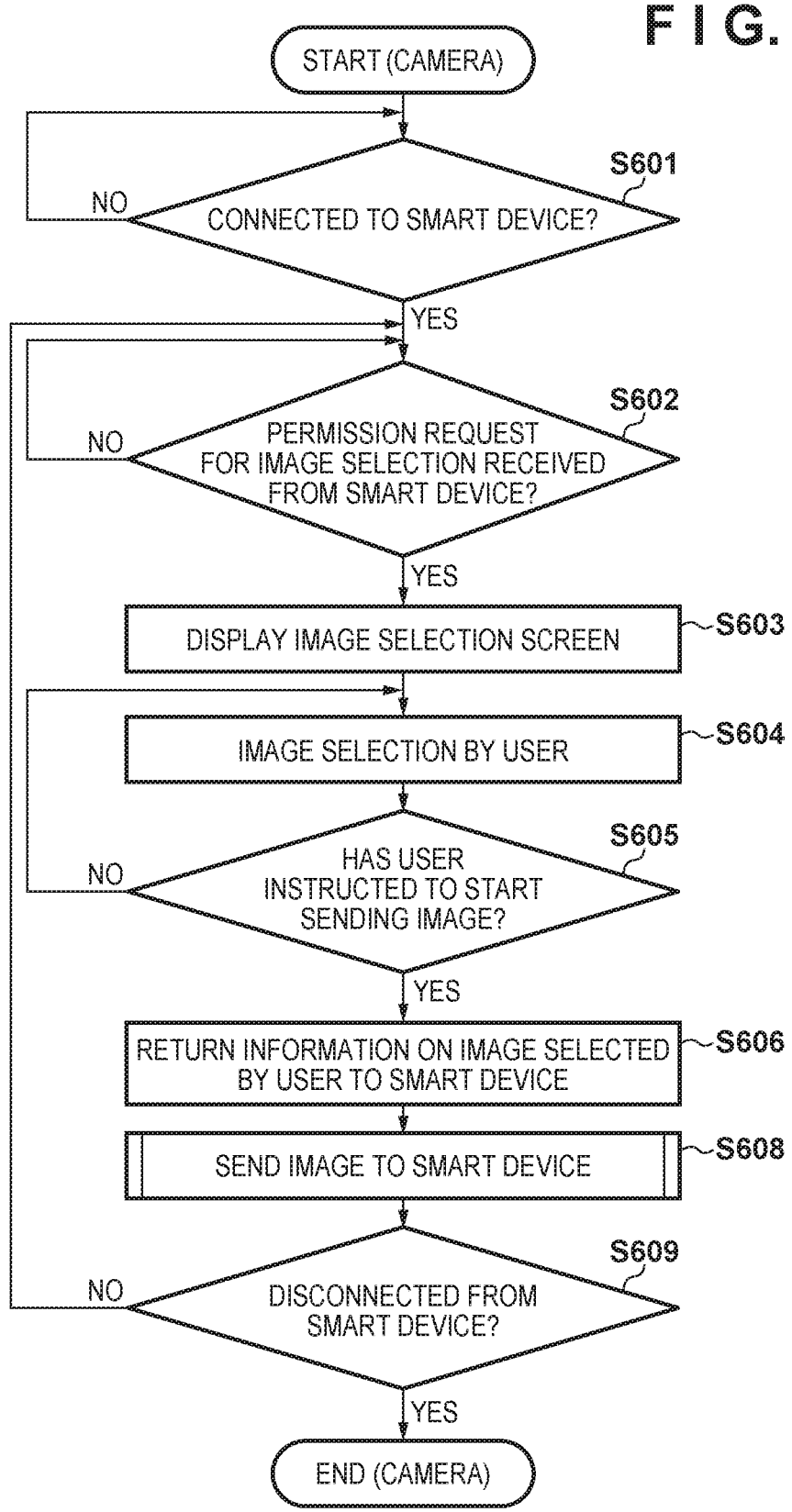
FIG. 6 is a flowchart illustrating processing performed in the digital camera according to the first embodiment.

FIG. 6 is a sequence describing the details of processing performed in the digital camera 100 at the time of performing push sending.

First, the digital camera 100 performs processing for connecting to the smart device 200 in order to send and receive images to and from the smart device 200. In step S601, if the control unit 101 detects a connection to the smart device 200 via the connecting interface 111, the procedure proceeds to step S602.

In step S602, the control unit 101 waits for reception of a long polling request from the smart device 200 via the connecting interface 111. Upon reception of a long polling request, the control unit 101 determines that a permission request for image selection is received from the smart device 200, and causes the processing to proceed to step S603.

In the push sending according to the present embodiment, an image (an imaged image stored in the recording medium 110) to be sent to the smart device 200 serving as a client device is selected in the digital camera 100 serving as a server device. For this purpose, in step S603, the control unit 101 displays an image selection screen 501 (see FIG. 5A) on the display unit 106, and causes the processing to proceed to step S604.

Next, the control unit 101 accepts an instruction to select an image to be sent via the operation unit 105 from the user in the loop of steps S604 and S605, and gradually builds an image list. Then, upon detection of an operation of the button 503 shown in FIG. 5A by the user, the control unit 101 advances the processing to step S606 in order to move to the image sending processing.

In step S606, the control unit 101 sends, to the smart device 200, an image list built by an image selection operation performed by the user, as a response to the long polling request received in the previous step S602. This image list includes an image file path, an image file size, and the like. This enables the smart device 200 to determine which images are to be subjected to push sending.

Next, in step S608, the control unit 101 receives an image acquisition request from the smart device 200 via the connecting interface 111, and repeats processing for sending, to the smart device 200, the corresponding image for which the acquisition request has been sent, for the number of times equal to the number of the images described in the image list. In this case, the control unit 101 knows the number of the selected images, and, therefore, displays a progress bar such as the one shown in FIG. 5C on the display unit 106. In this manner, images to be sent are selected by the digital camera 100, and sending of the images to the smart device 200 is achieved.

Finally, in step S609, if the control unit 101 detects a disconnection of the connection to the smart device 200, the processing ends. If a disconnection is not detected, the processing proceeds to step S602. Although disconnection detection is performed in step S609 here, the present invention is not limited thereto. The processing may be terminated upon detection of a disconnection at any timing during processing.

Processing Performed in Smart Device 200

Figure 7:
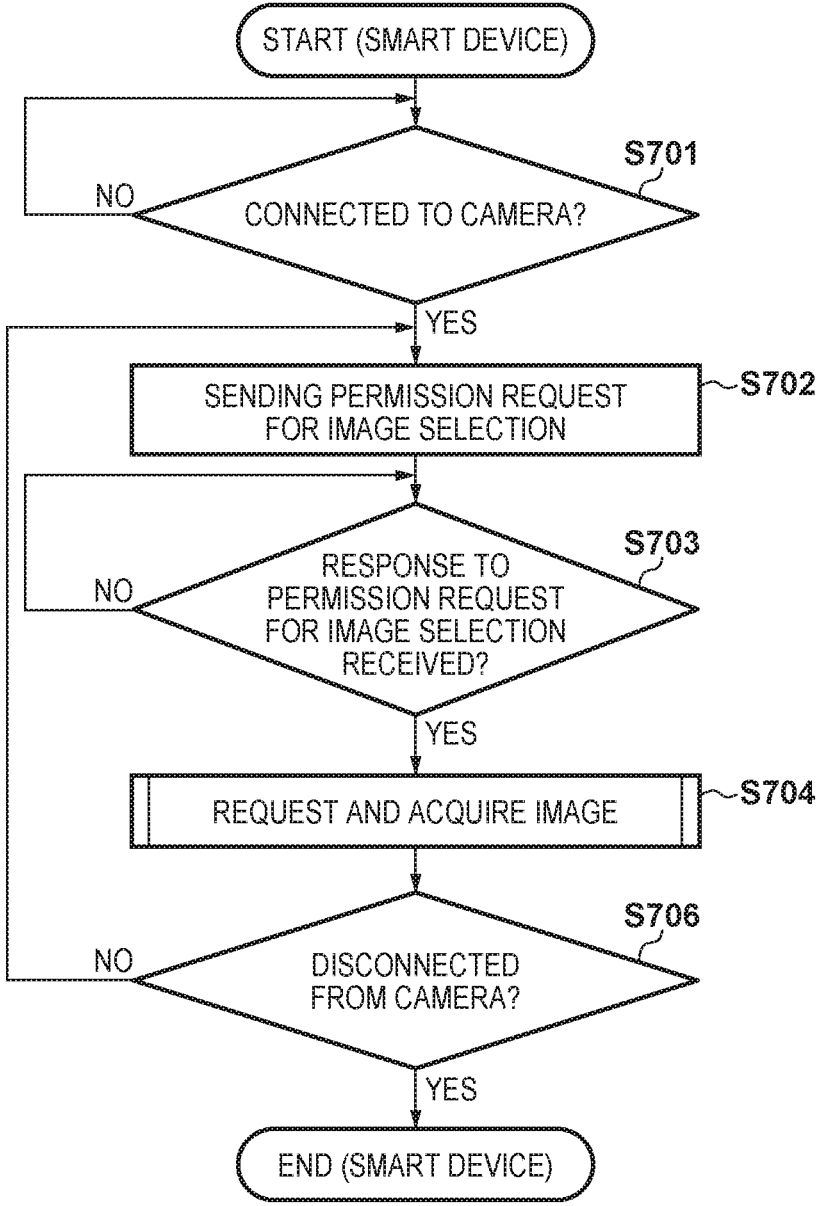
FIG. 7 is a flowchart illustrating processing performed in the smart device according to the first embodiment.

FIG. 7 is a sequence describing the details of processing performed in the smart device 200 at the time of performing push sending.

As with the digital camera 100 described above, the smart device 200 performs processing for connecting to the digital camera 100 in order to send and receive images to and from the digital camera 100. In step S701, if the control unit 201 detects a connection to the digital camera 100 via the connecting interface 211, the procedure proceeds to step S702.

In step S702, the control unit 201 sends a long polling request for acquiring information on images to be subjected to push sending from the digital camera 100 via the connecting interface 211. In step S703, upon reception of a response (image list) to the long polling request from the digital camera 100 via the connecting interface 211, the control unit 201 acquires the path of each of the images from the image list included in the response. Then, in step S704, the control unit 201 repeats an image request using the image paths, and an image acquisition (reception) for the number of times equal to the number of the images described in the image list. The acquired images are stored in the non-volatile memory 203 or the recording medium 210. At this time, the control unit 201 displays a progress bar as shown in FIG. 5D on the display unit 206 such that the state of progress of reception of images to be sent can be seen. After completing reception of all the images included in the image list, the control unit 201 may display the received images on the display unit 206. In this manner, images to be sent by the digital camera 100 are selected, and sending of the images to the smart device 200 is achieved.

Finally, in step S706, if the control unit 201 detects a disconnection of the connection to the digital camera 100, the processing ends. If a disconnection is not detected, the processing proceeds to the step S702. Although disconnection detection is performed in step S706 here, the present invention is not limited thereto. The processing may be ended upon detection of a disconnection at any timing during the processing.

As described above, according to the present embodiment, it is possible to provide a communication apparatus that can achieve sending of an image selected in a server device to a client device in a protocol that implements a client-server system.

Second Embodiment

In the first embodiment above, of the two sending modes different from each other, the control method of a communication function for push sending has been described. In the second embodiment, a control method of a communication function in a system in which two sending modes different from each other are both established will be described.

The flow of processing performed in a system in which two sending modes different from each other are both established will be described with reference to FIGS. 8 and 9A to 9F.

Figure 8:
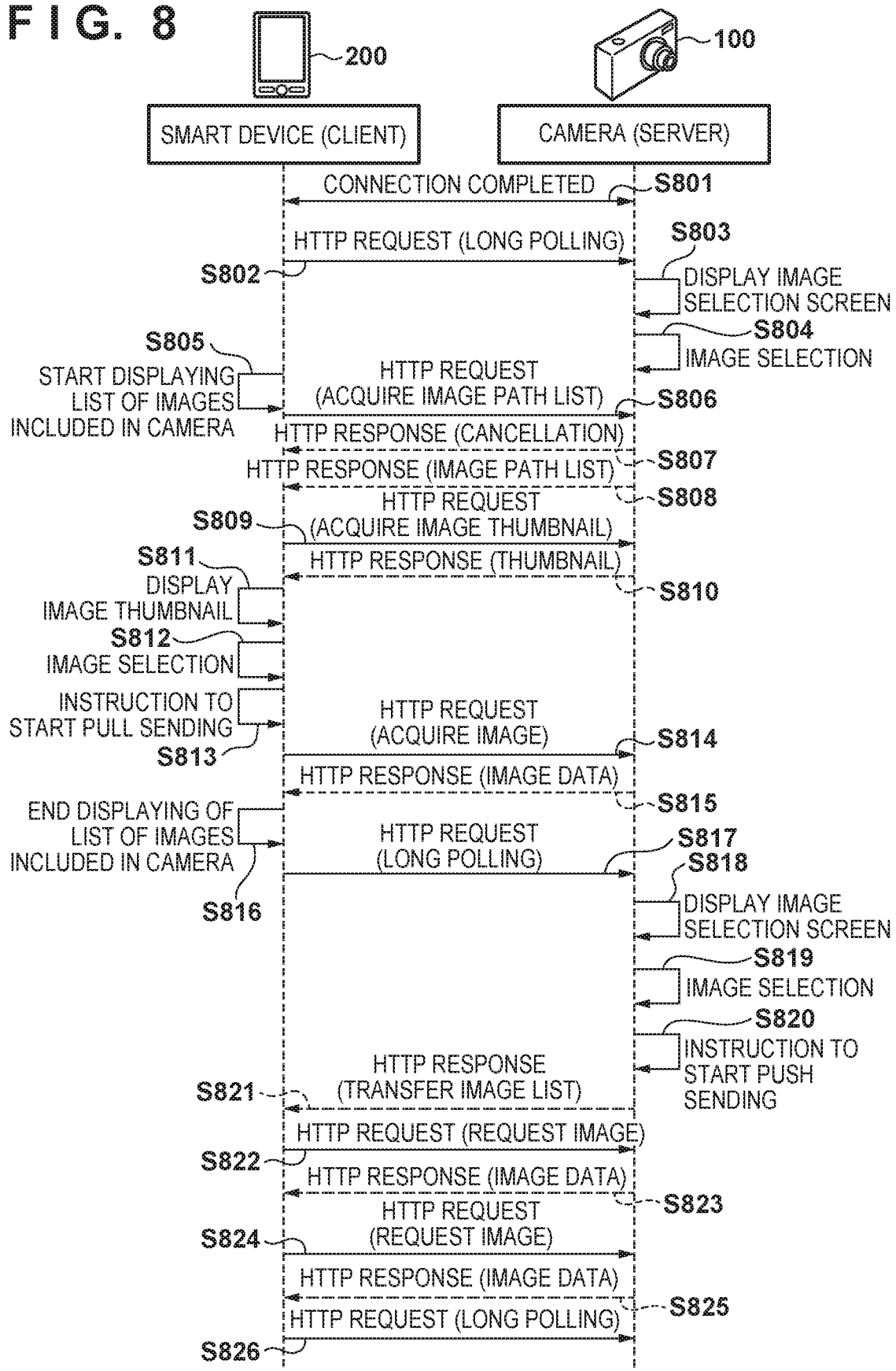
FIG. 8 is a diagram showing a sequence performed in a system according to a second embodiment.

FIG. 8 shows a sequence performed in a system in which two sending modes different from each other are both established.

FIGS. 9A to 9F show exemplary screens displayed on the respective display units 106 and 206 of the digital camera 100 and the smart device 200. Reference numerals 901 to 907 in FIGS. 9A to 9F in the present embodiment indicate the same parts or features as reference numeral 501 to 507 in the first embodiment, and the description thereof has been omitted.

Steps S801 to S804 in FIG. 8 are the same as steps S401 to S404 in the first embodiment, and, therefore, the description thereof has been omitted. In step S805, it is assumed that the user has depressed a button 904 indicating display of list of images included in the camera on the menu screen (FIG. 9B) displayed on the display unit 206 of the smart device 200. In this case, in step S806, the control unit 201 sends a request for acquiring a list of image paths to the digital camera 100. This is performed in the smart device 200 in order to check what images are saved in the digital camera 100, and to acquire file paths used during image acquisition.

Figure 9A:
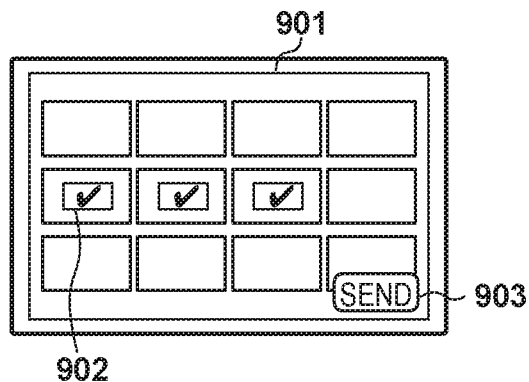
FIGS. 9A to 9F are diagrams illustrating UIs of a smart device and a digital camera according to the second embodiment.
Figure 9B:
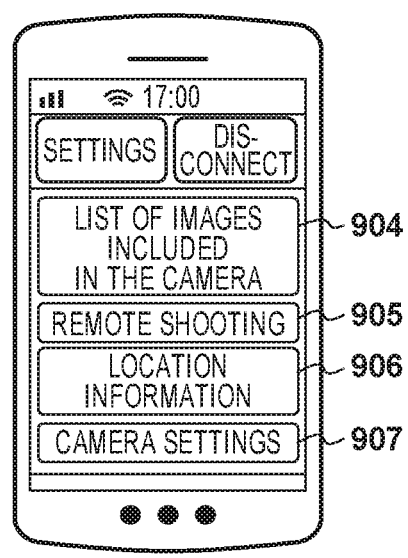
Figure 9C:
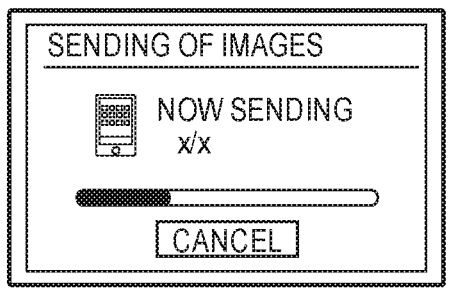
Figure 9D:
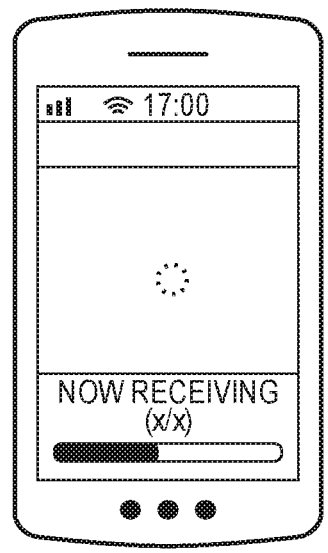
Figure 9E:

In step S807, the digital camera 100 receives this request while an image selection is being made by the user. Accordingly, the control unit 101 performs cancellation processing for the long polling request received in step S802. Here, cancellation processing refers to returning a response representing cancellation to a HTTP request. Note that the cancellation for the request can be performed by disconnecting the HTTP connection. In addition, to prevent the digital camera 100 from performing push sending, the control unit 101 displays a screen indicating an operation-disabled state for prompting the user to perform an operation on the smart device 200, as shown in FIG. 9E. Although the operation-disabled screen is displayed here in order to prevent push sending, the present invention is not limited thereto. For example, an image selection screen as shown in FIG. 9A may be kept displayed so as to prevent the send button 903 from being depressed.

Next, in step S808, the control unit 101 sends, as an HTTP response, a list of the file paths of the images saved in the recording medium 110 of the digital camera 100.

In steps S809 and S810, the smart device 200 acquires the thumbnails of the images described in the list of the file paths. Then, in step S811, the control unit 201 of the smart device 200 displays an image thumbnail list screen 908 as shown in FIG. 9F on the display unit 206.

Next, in step S812, the user selects an image to be subjected to pull transfer by operating the smart device 200. When the user selects an image to be transferred, the control unit 201 displays a check mark in a superimposed manner, as indicated by reference numeral 908 in FIG. 9F. Next, in step S813, if depression of a receive button 909 shown in FIG. 9F by the user is detected, the control unit 201 makes, in step S814, an acquisition request for the selected image. To this request, the control unit 101 of the digital camera 100 sends the corresponding image. The image received by the smart device 200 may be displayed in an enlarged manner on the smart device 200, or may be saved as a file.

Figure 9F:
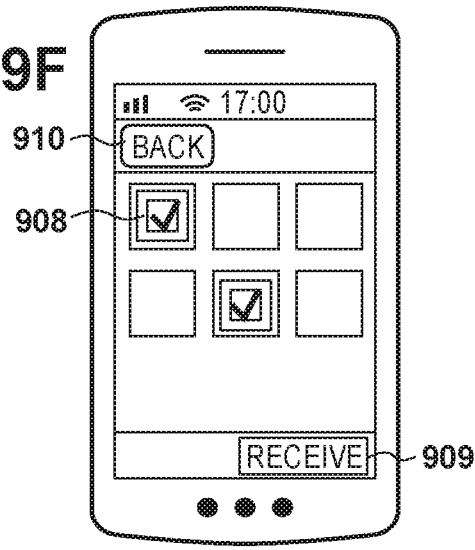

Next, if the control unit 201 detects depression of a button 910 for ending the pull transfer, as indicated by reference numeral 910 in FIG. 9F, by the user, the control unit 201 ends, in step S816, the processing for displaying the list of images included in the camera. In step S817, the control unit 201 makes a long polling request for performing push sending to the digital camera 100, and returns to displaying of the menu screen shown in FIG. 9B.

Upon reception of the long polling request, the digital camera 100 displays, in step S818, an image selection screen as shown in FIG. 9A.

Steps S819 to S826 that follow are the same as steps S404 to S411 in the first embodiment, and, therefore, the description thereof has been omitted. In this manner, by appropriately switching between pull sending and push sending, two different sending modes are implemented.

Processing Performed in Digital Camera 100

Figure 10:
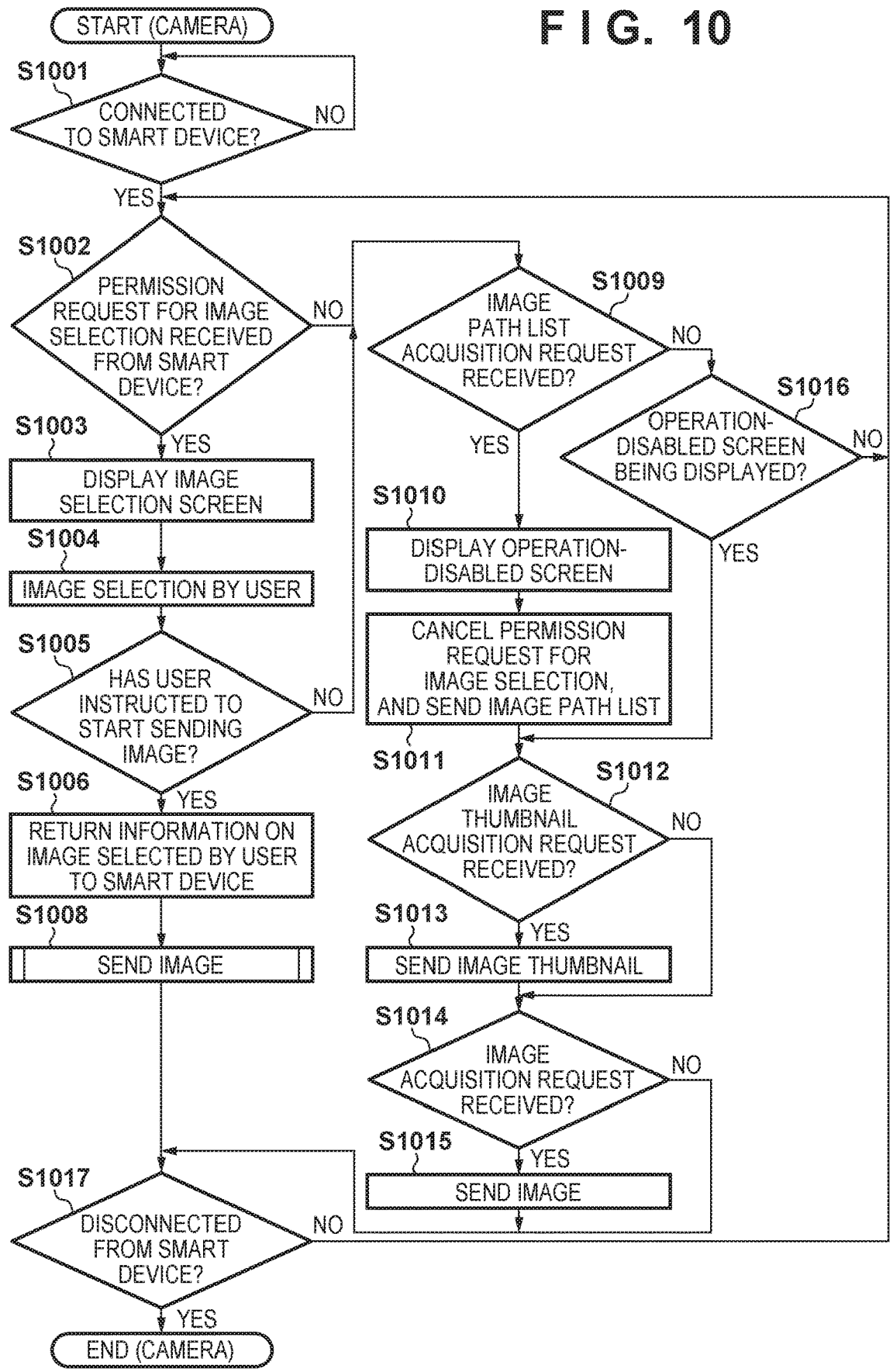
FIG. 10 is a flowchart illustrating processing performed in the digital camera according to the second embodiment.

FIG. 10 is a flowchart describing the details of the processing performed in the digital camera 100 in a system in which two sending modes different from each other are both established.

In the present embodiment, when a permission request for image selection (long polling request) is received (step S1002), push sending is started. When an image path list acquisition request is received (step S1009), pull sending is started. Further, in the present embodiment, when an image path list acquisition request is received during push sending, the push sending is interrupted, and a pull sending is started. When a permission request for image selection is received during pull sending, the pull sending is interrupted, and a push sending is started. However, the present invention is not limited thereto. For example, in an embodiment in which priority is given to push sending, it is not necessary to transition to pull sending even when an image path list acquisition request is received during push sending. In an embodiment in which priority is given to pull sending, it is not necessary to transition to push sending even when permission request for image selection is received during pull sending.

Operations in the pull sending mode in a system in which push sending and pull sending are both established will be described below with reference to steps S1002 to S1008.

First, the digital camera 100 performs processing for connecting to the smart device 200 in order to send and receive images to and from the smart device 200. In step S1001, if the control unit 101 detects a connection to the smart device 200 via the connecting interface 111, the processing proceeds to step S1002.

Next, in step S1002, the control unit 101 receives a long polling request from the smart device 200 via the connecting interface 111. When the long polling request is received, the control unit 101 determines that an image selection permission is received from the smart device 200, and the processing proceeds to step S1003. When a long polling request is not received, the processing proceeds to step S1009.

Next, in step S1003, the control unit 101 displays a sending image selection screen 901 as shown in FIG. 9A on the display unit 106. In step S1004, the control unit 101 accepts a selection of an image to be sent based on an instruction from the user via the operation unit 105, and adds information specifying the selected image to the image list secured in the work memory 104. Then, in step S1005, the control unit 101 determines whether the send button 903 shown in FIG. 9A has been operated. If the control unit 101 determines that the send button has been operated, the control unit 101 causes the processing to proceed to step S1006. If not, the control unit 101 advances the processing to step S1009.

Next, in step S1006, the control unit 101 sends, to the smart device 200, an image list built in accordance with the user operations via the connecting interface 111, as a response to the long polling request received in step S1002 described previously. The information on the image list includes an image file path, an image file size, and the like. This enables the smart device 200 to determine what images are to be subjected to push sending.

Next, in step S1008, the control unit 101 executes processing for receiving an image request from the smart device 200, and sending the corresponding image. During this processing, the control unit 101 knows the number of the images described in the image list, and, therefore, displays a progress bar (FIG. 9C) relating to the sending. Upon completion of sending of all the images, the control unit 101 causes the processing to proceed to step S1017.

Next, operations in the pull sending mode in the system in which push sending and pull sending are both established will be described with reference to steps S1009 to S1015.

First, in step S1009, if the control unit 101 detects a reception of an image path list acquisition request from the smart device 200 via the connecting interface 111, the processing proceeds to step S1010 in order to start sending files. If the control unit 101 does not detect the reception, the processing proceeds to step S1016.

In step S1010, the control unit 101 displays a message indicating an operation-disabled screen as shown in FIG. 9E on the display unit 106. This display prevents an instruction to start push sending from being given even when the operation unit 105 is operated. Next, in step S1011, when a permission request for image selection is received from the smart device 200, the control unit 101 sends a response indicating cancellation to the request. Here, as the cancellation, a status code of a response header in HTTP is returned as an error code. However, the present invention is not limited thereto. For example, instead of using the status code as the error code, information indicating cancellation may be included in the response body. It is sufficient that the smart device 200 can recognize that the long polling request to the digital camera 100 has been cancelled. Although cancellation is performed for the permission request for image selection in the present embodiment, the present invention is not limited thereto. For example, it is possible to send an image path list while holding a permission request for image selection, and implement pull sending during push sending.

Then, for the image path list acquisition request received in step S1009, the control unit 101 sends a list of image paths of the images saved in the recording medium 110 to the smart device 200 via the connecting interface 111. This enables the smart device 200 to recognize the information for accessing the images saved in the recording medium of the digital camera 100.

On the other hand, in step S1016, if the operation-disabled screen has already been displayed, the control unit 101 determines that the mode has already transitioned to the pull sending mode, and the processing proceeds to step S1012. If the operation-disabled screen is not displayed, the control unit 101 determines that the mode has not transitioned to the pull sending mode, and the processing proceeds to step S1002. Although whether the mode has transitioned to the pull sending mode is determined with the operation-disabled screen here, the present invention is not limited thereto. For example, a flag indicating the current sending mode may be recorded in the work memory 104, and the sending mode may be determined by referring to information on the flag.

Next, operations of the digital camera 100 for a thumbnail acquisition request for displaying an image selection screen as shown in FIG. 9F on the smart device 200 will be described.

First, in step S1012, when the control unit 101 receives an image thumbnail acquisition request from the smart device 200 via the connecting interface 111, the processing proceeds to step S1013. In step S1013, the control unit 101 sends the specified thumbnail image from the smart device 200 via the connecting interface 111.

On the other hand, in step S1012, if the control unit 101 determines that an image thumbnail acquisition request is not received, the processing proceeds to step S1014.

Operations of the digital camera 100 for an image acquisition request for acquiring an image in the smart device 200 will be described with reference to steps S1014 and S1015.

First, in step S1014, when the control unit 101 receives an image acquisition request from the smart device 200 via the connecting interface 111, the processing proceeds to step S1015. In step S1015, the control unit 101 sends the specified image from the smart device 200 via the connecting interface 111.

On the other hand, in step S1014, if it is determined that an image acquisition request is not received, the processing proceeds to step S1017.

Finally, in step S1017, if the control unit 101 detects a disconnection of the connection to the smart device 200, the processing ends. If not, the processing proceeds to step S1002. Although disconnection detection is performed in step S1017 here, the present invention is not limited thereto. The processing may be ended upon detection of a disconnection at any timing during the processing.

Processing Performed in Smart Device 200

Figure 11A:
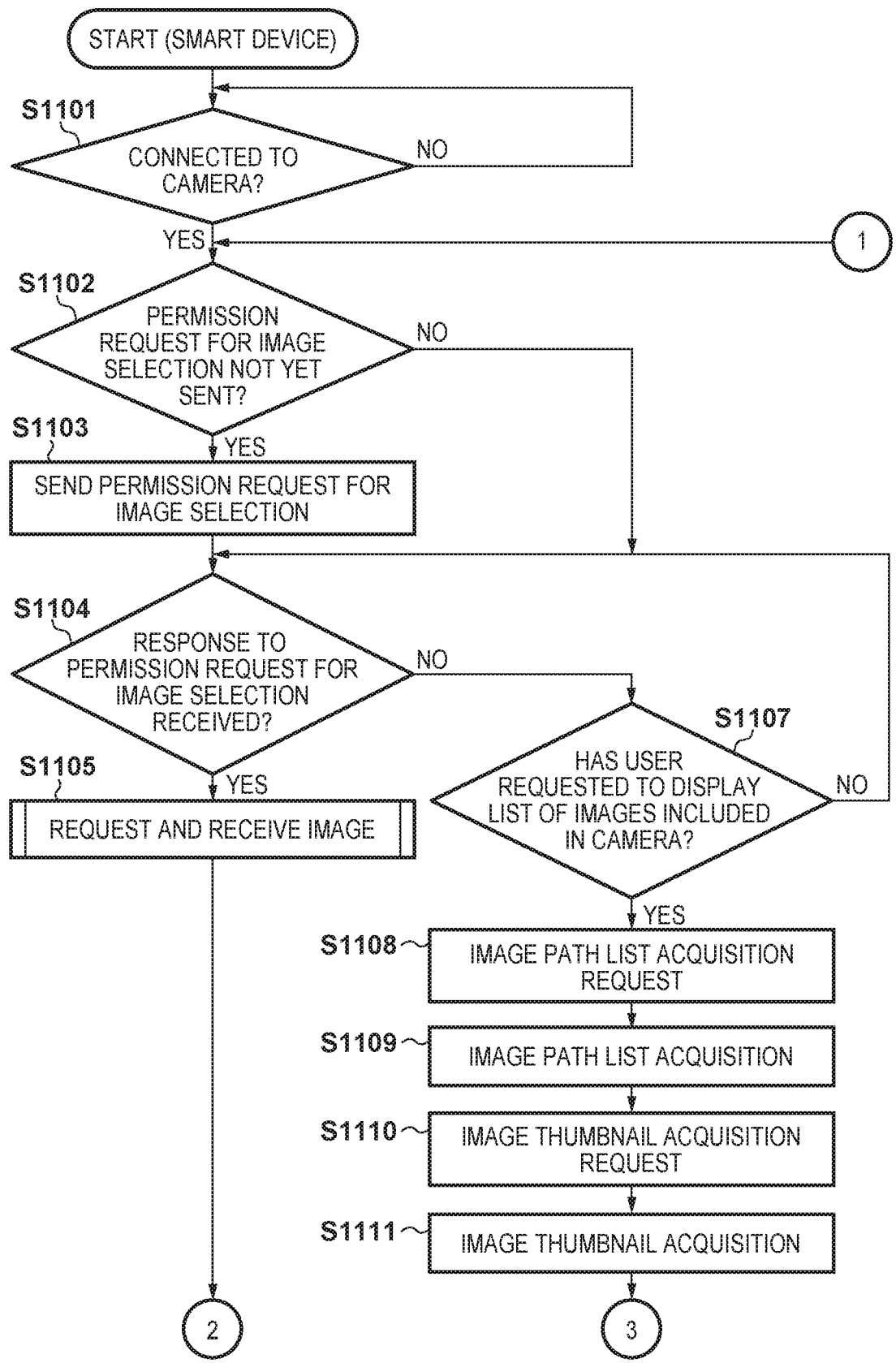
FIGS. 11A and 11B are flowcharts illustrating processing performed in the smart device according to the second embodiment.
Figure 11B:
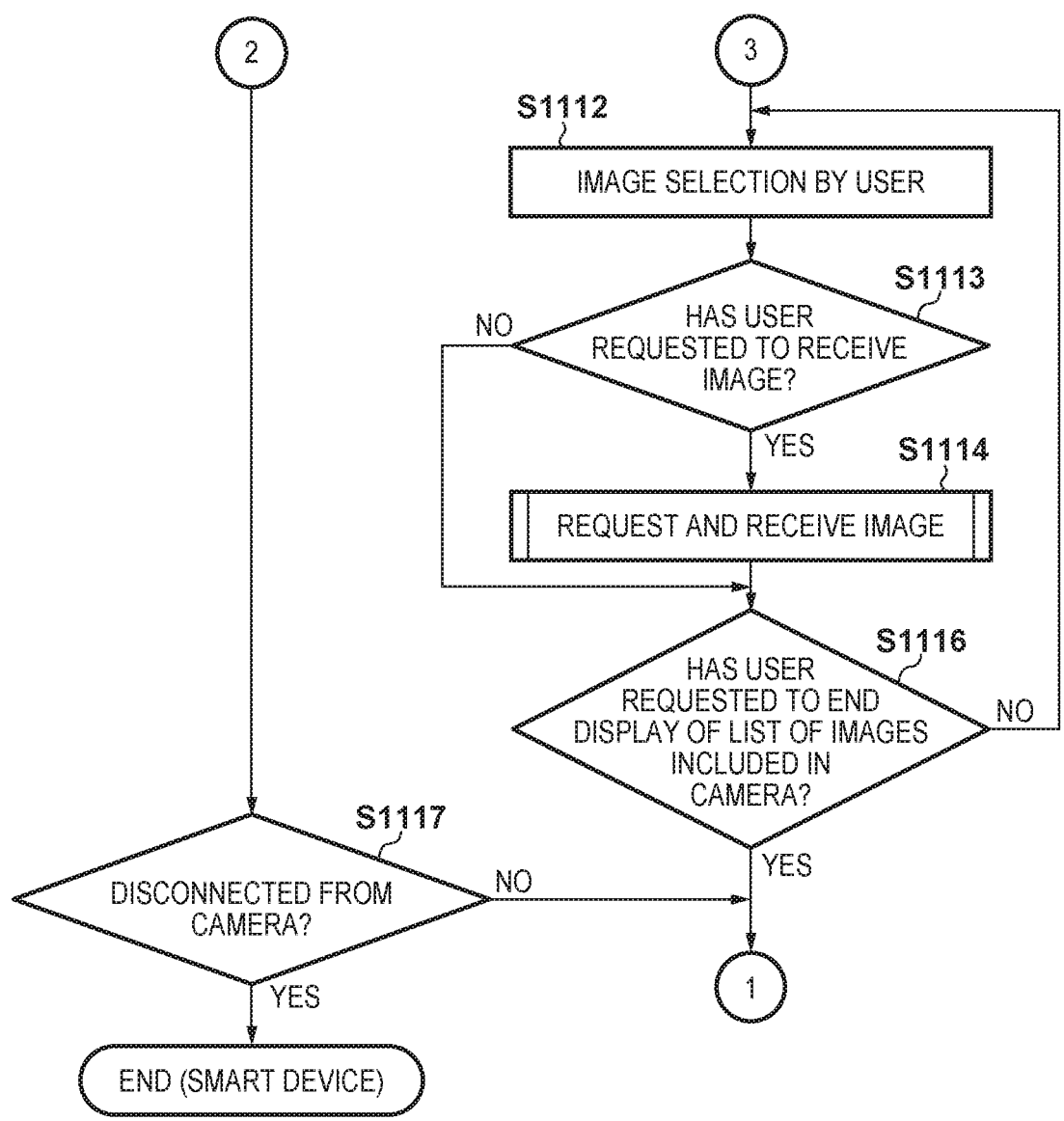

FIGS. 11A and 11B are flowcharts describing the details of processing performed in the smart device 200 in a system in which two sending modes different from each other are both established.

As with the digital camera 100 described above, the smart device 200 performs processing for connecting to the digital camera 100 in order to send and receive images to and from the digital camera 100. In step S1101, if the control unit 201 detects a connection to the digital camera 100 via the connecting interface 211, the processing proceeds to step S1102.

In step S1102, the control unit 201 determines whether a permission request for image selection (long polling request) has already been sent. If a permission request for image selection has already been sent, the mode has transitioned to the push sending mode, and, therefore, it is not necessary to send a permission request for image selection. This processing is processing for performing this control. Next, in step S1103, the control unit 201 makes a long polling request for acquiring information on an image to be subjected to push sending from the digital camera 100 via the connecting interface 211.

In step S1104, when the control unit 201 receives a response to the long polling request from the digital camera 100 via the connecting interface 211, the control unit 201 causes the processing to proceed to step S1105.

In step S1105, the control unit 101 acquires an image path from the content (image list) of the received response. Then, by using the path, the control unit 101 repeats processing for requesting to send an image to the digital camera 100 via the connecting interface 211, and receiving the image (and processing for storing the image into the recording medium 210 or the like). This processing is performed for the number of times equal to the number of the images described in the received image list. Then, during this processing, the control unit 201 displays a progress bar as shown in FIG. 9D on the display unit 206 such that the state of progress of reception of the images can be seen. After completing reception of all the images included in the image list, the control unit 201 may display the received images on the display unit 206. In this manner, images to be sent can be selected by the digital camera 100, and push sending for sending images to the smart device 200 can be achieved.

In step S1104, if the control unit 201 determines that a response to the long polling request is not received from the digital camera 100, the processing proceeds to step S1107. In step S1107, the control unit 201 determines whether "List of images included in the camera" button 904 in the operation menu as shown in FIG. 9B has been depressed via the operation unit 205. If it is determined that the button 904 has been depressed, the control unit 201 causes the processing to proceed to step S1108 in order to proceed to the processing for pull sending.

Thereafter, in steps S1108 to S1111, the control unit 201 performs acquisition of the image list saved in the digital camera 100 and acquisition of image thumbnails in order to display an image thumbnail list screen as shown in FIG. 9F on the display unit 206.

Next, in step S1112, the control unit 201 detects an operation of the operation unit 205 performed by the user, and adds an image to be subjected to pull transfer to the list. At this time, the control unit 201 displays a check mark so as to be superposed on the selected image to allow the user to easily recognize the selected image, as indicated by reference numeral 908 in FIG. 9F.

In step S1113, if the control unit 201 detects depression of the receive button 909 shown in FIG. 9F by the user via the operation unit 205, the control unit 201 causes the processing to proceed to step S1114. In step S1114, the control unit 201 sends a sending request for an image shown in the list selected by the user to the digital camera 100 via the connecting interface 211, and repeats processing for receiving an image as a response to the request, for the number of times equal to the number of the images selected by the user. At the time of performing this image reception, the control unit 201 displays a progress bar as shown in FIG. 9D on the display unit 206 such that the state of progress of image reception can be seen.

Next, in step S1116, if the control unit 201 determines that the operation of the operation unit 205 by the user is performed on the button 910 shown in FIG. 9F for ending the pull transfer, the control unit 201 ends the pull sending, and proceeds to step S1102.

Note that if acquisition of all the images is completed, the processing may proceed from step S1116 to step S1117. Then, if the control unit 201 detects a disconnection of the connection to the digital camera 100, the processing ends. If not, the processing proceeds to step S1102. Although disconnection detection is performed in step S1117 here, the present invention is not limited thereto. The processing may be ended upon detection of a disconnection at any timing during the processing.

As described above, according to the second embodiment, it is possible to provide a communication apparatus that can achieve sending of images selected by a server device or a client device to the client device in a protocol that implements a client-server system.

Although the present invention has been described above based on preferred embodiments thereof, the present invention is not limited to these specific embodiments, and various embodiments that do not depart from the scope of the present invention are also included in the invention. Although the object to be sent has been described as an image in the above embodiments, the object is not limited thereto. For example, the object to be sent may be any file such as a sound file or a document file that can be exchanged between a client device and a server device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-091945, filed May 2, 2017 which is hereby incorporated by reference herein in its entirety.

What is claimed is:

1. An image supply apparatus functioning as a server that sends an image in response to a request from a client device, comprising:
   a storage that stores an image;
   a communication interface that performs communication using a request/response communication protocol; and
   a processer that returns a response via the communication interface by performing processing in accordance with a type of a request received from a client device via the communication interface,
   wherein the processor:
   when a predetermined long polling request is received after communication connection with the client device is established, displays a list of images stored in the storage, as a user interface selectable by a user, in a state where a response to the predetermined long polling request is suspended,
   when the user has selected an image via the user interface, generates information specifying the selected image for enabling the client device to make a sending request for the selected image to be sent by push sending to the client device, and
   sends the generated information, by server push, to the client device as a response to the predetermined long polling request.

2. The apparatus according to claim 1, further comprising an imaging unit, wherein the storage stores an image imaged by the imaging unit.

3. The apparatus according to claim 1, wherein the processor,
   when a request for a list of images from the client device is received, sends information specifying each of the images stored in the storage in order to enable the client device to select an image to be sent, as a response to the request for the list of the images.

4. The apparatus according to claim 3, wherein,
   when a request for the list of the images is received from the client device while an image is being selected via the user interface displayed as a result of receiving the predetermined long polling request, the processor executes sending by sending information indicating that the predetermined long polling request has been cancelled, as a response corresponding to the predetermined long polling request, and causes the user interface to transition to an operation-disabled state.

5. The apparatus according to claim 1, wherein the information specifying each of the images stored in the storage includes at least one of an image file name, an image ID, and an image path.

6. The image supply apparatus of claim 1, wherein the communication interface uses an HTTP communication protocol.

7. The image supply apparatus of claim 1, wherein at least one of the predetermined long polling request or the response to the predetermined long polling request is sent using an HTTP communication protocol.

8. The image supply apparatus of claim 1, wherein the response to the predetermined long polling request is suspended during both display of the list of images and generation of the information specifying the selected image for enabling the client device to make the sending request.

9. A control method of an image supply apparatus functioning as a server that includes a storage that stores an image; and a communication interface that performs communication using a request/response communication protocol, and sends an image in response to a request from a client device, the method comprising:
   executing processing for returning a response via the communication interface by performing processing in accordance with a type of a request received from a client device via the communication interface,
   wherein the executing includes
   when a predetermined long polling request is received after communication connection with the client device is established, displaying a list of images stored in the storage as a user interface selectable by a user, in a state where a response to the predetermined long polling request is being suspended,
   when the user selects an image via the user interface, generating information specifying the selected image in order to enable the client device to make a sending request for the selected image to be sent by push sending to the client device, and
   sending the generated information, by server push, to the client device as a response to the predetermined long polling request.

10. The control method of claim 9, wherein the communication interface uses an HTTP communication protocol.

11. The control method of claim 9, wherein at least one of the predetermined long polling request or the response to the predetermined long polling request is sent using an HTTP communication protocol.

12. The control method claim 9, wherein the response to the predetermined long polling request is suspended during both display of the list of images and generation of the information specifying the selected image for enabling the client device to make the sending request.

13. A non-transitory computer-readable storage medium storing a program for causing a computer to execute steps of a method for, as a server, sending an image in accordance with a request from a client device by the computer reading and executing the program, the computer including a storage that stores an image and a communication interface that performs communication using a request/response communication protocol, the method comprising:
   executing processing for returning a response via the communication interface by performing processing in accordance with a type of a request received from a client device via the communication interface, wherein the executing includes, when a predetermined long polling request is received after communication connection with the client device is established, displaying a list of images stored in the storage unit as a user interface selectable by a user, in a state where a response to the predetermined long polling request is being suspended, when the user selects an image via the user interface, generating information specifying the selected image in order to enable the client device to make a sending request for the selected image to be sent by push sending to the client device, and sending the generated information, by server push, to the client device as a response to the predetermined long polling request.

14. The non-transitory computer-readable storage medium of claim 13, wherein the communication interface uses an HTTP communication protocol.

15. The non-transitory computer-readable storage medium of claim 13, wherein at least one of the predetermined long polling request or the response to the predetermined long polling request is sent using an HTTP communication protocol.

16. The non-transitory computer-readable storage medium of claim 13, wherein the response to the predetermined long polling request is suspended during both display of the list of images and generation of the information specifying the selected image for enabling the client device to make the sending request.

\* \* \* \* \*